United States Patent [19]

Lipp

[11] Patent Number: 4,822,660
[45] Date of Patent: Apr. 18, 1989

[54] LIGHTWEIGHT CERAMIC STRUCTURES AND METHOD

[75] Inventor: G. Daniel Lipp, Painted Post, N.Y.

[73] Assignee: Corning Glass Works, Corning, N.Y.

[21] Appl. No.: 57,533

[22] Filed: Jun. 2, 1987

[51] Int. Cl.$^4$ .............................................. B32B 9/00
[52] U.S. Cl. .................................... 428/113; 428/118; 428/188; 428/697
[58] Field of Search ............... 428/113, 118, 188, 367, 428/408, 697, 902

[56] References Cited

U.S. PATENT DOCUMENTS

| | | | |
|---|---|---|---|
| 4,017,347 | 4/1977 | Cleveland | 156/89 |
| 4,026,746 | 5/1977 | Straw | 428/188 |
| 4,051,289 | 9/1977 | Adamson | 428/113 |
| 4,223,053 | 9/1980 | Brogan | 428/188 |
| 4,324,843 | 4/1982 | Brennan et al. | 428/114 |
| 4,568,594 | 2/1986 | Hordonneau et al. | 428/113 |
| 4,581,053 | 4/1986 | Prewo et al. | 501/88 |
| 4,626,515 | 12/1986 | Chyung et al. | 501/32 |

Primary Examiner—Nancy A. B. Swisher
Attorney, Agent, or Firm—Kees van der Sterre

[57] ABSTRACT

Bonded ceramic matrix composite structures such as ceramic panels or beams, and a method for making them, are described, the structures comprising ceramic facing sheets to which are bonded one or an array of relatively thin-walled, hollow, high-stiffness channeled ceramic support elements, the support elements being of modular design with each support being formed by a continuous composite ceramic wall incorporating multidirectional fiber reinforcement and defining a central channel extending, in the bonded structure, in a direction generally parallel with the ceramic facing sheets.

9 Claims, 2 Drawing Sheets

LIGHTWEIGHT CERAMIC STRUCTURES AND METHOD

BACKGROUND OF THE INVENTION

The present invention is in the field of composite ceramics and particularly relates to panels or other structures formed of composite ceramics and exhibiting good strength and stiffness at high temperatures.

A general configuration for a strong, rigid flat structural member or panel, whether formed of paperboard, plastic or other material, consists of a corrugated or pleated central ply sandwiched between opposing flat plies or facing sheets. The corrugation or pleating of the control ply imparts higher stiffness to the composite, particularly against bending about axes in the plane of the panel transverse to the channels formed by the pleated or corrugated central ply, but also about axes paralleling these channels. Thus bending of the panel normally requires bending or rupture of the curved or angled portions forming the corrugation or pleating, and in fact the rigidity of the composite can be improved by increasing the stiffness of the corrugation or pleating material.

Ceramic structures embodying corrugated or channeled designs have been developed for high temperature applications, although in some cases the end uses have involved fluid (gas) treatment or heat exchanging rather than structural support. U.S. Pat. Nos. 3,112,184 and 3,904,473 describe the manufacture of ceramic honeycomb structures of this type, while U.S. Pat. No. 4,617,072 discloses carbon and carbon-fiber composite honeycomb structures intended for high-temperature structural applications.

Composite ceramics of the type currently being developed for high temperature applications typically consist of a matrix phase composed of a glass, crystalline ceramic, or semicrystalline glass-ceramic within which is disposed a reinforcing phase composed of an inorganic fiber or whisker material such as carbon, silicon carbide, alumina, silicon nitride or the like. These composites may find use in structural applications such as high temperature engine components, and the incorporation of a reinforcing whisker or fiber phase has been deemed necessary to attain the strength and toughness needed for this use. U.S. Pat. Nos. 4,615,987 and 4,626,515 describe compositions for composite ceramics of this type.

Fiber-containing composite ceramics produced for high-temperature applications have generally been prepared by processes involving the coating of individual fibers or the impregnation of fiber yarns, mats or cloth with solutions or suspensions of glass or ceramic particles, followed by the consolidation of the resulting fibers or mats into dense composite materials with heat and pressure. U.S. Pat. No. 4,568,594 describes a method for impregnating a multidirectional woven network of fibers in a suspension of ceramic powder, while U.S. Pat. No. 4,581,053 discloses a process wherein an individual fiber is coated with a glass powder suspension, and thereafter dried and woven into a predetermined structural shape. U.S. Pat. No. 4,613,473 describes yet another approach wherein both the matrix and the reinforcement are provided in fiber form and both are woven together to produce a cloth which can be consolidated to a dense composite material.

The need for stiffness in fiber composite structures such as beams and panels has fostered the development of structural designs and fabrication techniques which take advantage of the generally high elastic moduli of commercially available fibrous reinforcement materials. In the case of fiber-resin composites, for example, U.S. Pat. No. 4,591,400 discloses the use of a removable mandrel as a temporary substrate for laying up hollow beam members of resin-impregnated glass fibers. The hollow beams can thereafter be stiffened with auxiliary composite elements and/or shaped by subsequent molding to provide structural elements such as I-beam members, with the glass fibers imparting the desired stiffness and strength to the final structure.

As noted in U.S. Pat. No. 4,568,594, however, the fabrication of rigid composite structures in ceramic systems is complicated by the nature of the ceramic matrix materials. Hence, these materials are generally available only in granular or fine particulate form, and the uniform impregnation of complex fibrous structures with the matrix can be difficult. Nevertheless, composite ceramic structures of the highest possible density are required to optimize strength and rigidity, and therefore the forming procedure which is selected to fabricate such a structure must be one which insures product homogeneity and minimizes structural porosity or voids.

It is therefore a principal object of the present invention to provide a fabrication method for making rigid composite ceramic structures such as panels or beams which provides a product of high strength, improved stiffness and minimal porosity.

It is a further object of the invention to provide a design for a bonded composite ceramic structure which insures optimum strength and, especially, stiffness in the product.

Other objects and advantages of the invention will become apparent from the following description.

SUMMARY OF THE INVENTION

The present invention addresses the need for improved composite ceramic structures such as panels, beams or the like by providing a bonded ceramic structure wherein enhanced strength and stiffness is provided by combining one or more ceramic facing sheets with one or an array of relatively thin-walled, hollow, high-stiffness channeled ceramic support elements. One or more of the support elements are bonded to the facing sheet or between facing sheets, being positioned for bonding so that the channel axis of each support element (the axis substantially centered within the hollow channel cross-section and parallel with the channel walls) is generally parallel with the facing sheet(s). The support elements are made from a fiber-reinforced composite ceramic material wherein the orientation of the fibers within the support is controlled to achieve high strength and stiffness in the support.

The bonded ceramic structures of the invention can be directly used, for example, as beam or panel members, or they can be combined with additional members or other high strength metal or ceramic parts to provide complex refractory high-strength structures. The design of the bonded ceramic structure imparts particularly high resistance to bending or crushing deformation thereto.

The facing sheet of the composite ceramic structure of the invention preferably consists of a sheet of composite ceramic material comprising a glass, glass-ceramic, or crystalline ceramic matrix in which is disposed an inorganic reinforcement phase. The inorganic reinforcement phase is preferably a fibrous reinforcement consisting, for example, of inorganic whiskers or fibers.

The channeled composite ceramic support elements are of modular design, each individual support comprising a continuous composite ceramic wall defining a circumferentially enclosed elongated channel. The wall consists of a glass, glass-ceramic, or crystalline ceramic matrix phase within which the fiber reinforcement phase, consisting of a multiplicity of inorganic fibers, is disposed. The fiber reinforcement is multidirectionally oriented within wall of the support structure, i.e., the fibers run in at least two and preferably more different directions. Multidirectional orientation is typically achieved by providing multiple layers or plies of aligned fibers within the wall, the layers being arranged in cross-ply orientation with respect to each other. This multidirectional orientation has the effect of insuring that some of the fibers traverse the corners of the channel wall, imparting high corner strength and enhancing crush resistance in the bonded structure.

The process for making the support elements generally comprises, first, providing a mandrel or similar support having a cross-sectional shape generally corresponding to the channel shape selected for the ceramic supports to be provided. A preform for the ceramic support is then built up on the mandrel by winding or otherwise applying on the mandrel one or more layers of inorganic reinforcing fibers thereto. The fibers are coated before, during, or after application to the mandrel with particles of a ceramic material selected from the group of glasses, thermally crystallizable glasses, or crystalline oxides.

Finally, the support preform is consolidated into an integral composite ceramic support element by heating it to a temperature at least sufficient to consolidate the particles of ceramic material into an integral matrix within which the inorganic reinforcing fibers are disposed. In general, consolidation may be carried out before or during the bonding of the support elements to the support sheets.

DESCRIPTION OF THE DRAWING

The invention may be further understood by reference to the drawing wherein.

DETAILED DESCRIPTION

The bonded composite ceramic structures of the invention are best made employing composite ceramic materials such as have been recently developed for applications wherein strength, toughness, and creep resistance at high temperatures are required. These may generally be described as fiber- and/or whisker-reinforced glasses, glass-ceramics (i.e., crystalline ceramics made by crystallizing glasses), and conventional ceramics (i.e., crystalline ceramics made by consolidating or fusion-casting non-glass forming crystalline oxide materials) wherein the fibers and/or whiskers enhance the high-temperature physical properties of the matrix glasses, glass-ceramics, or ceramics.

The use of inorganic whiskers and fibers to reinforce glasses, glass-ceramics and ceramics is well known. Whiskers have frequently been characterized in the literature as relatively short, single-crystal fibers of small diameter (typically less than 100 microns), whereas fibers, while of similar diameter, are considered to be multicrystalline or amorphous and are generally longer than whiskers, so that they can be used in woven or otherwise interlocking bundles, yarns, or cloth.

The mechanism of strengthening of glass, glass-ceramic, or ceramic bodies by fibers is considered to be that of load transfer by the matrix to the fibers through shear. This load transfer shifts stress from the glass or ceramic matrix to the relatively long, high modulus fibers, while the fibers at the same time may act to impede crack propagation in the matrix material.

Whiskers are thought to impart strengthening by a similar mechanism, but load transfer to whiskers by the matrix is more limited due to the limited length and aspect ratio of the whiskers. Theoretically, a whisker which is sufficiently short will not be loaded to the breaking point by the matix under stress, and therefore full advantage cannot be taken of the high strength of the whiskers. However, since whiskers are typically incorporated as a randomly dispersed phase in a selected glass or ceramic matrix, rather than in a preferential alignment as with fibers, the physical properties of the composites are generally more isotropic.

Among the whiskers and fibers which have been suggested for use as reinforcement for nonmetal (ceramic) matrix materials are silicon carbide, silicon nitride, alumina and carbon whiskers. The use of such whiskers to impart improved strength and toughness to alumina, boron carbide, and mullite ceramics is described in U.S. Pat. No. 4,543,345. U.S. Pat. Nos. 4,615,987 and 4,626,515 describe ceramic composites wherein the matrix phases consist of glasses or glass-ceramics.

Figure 1A:
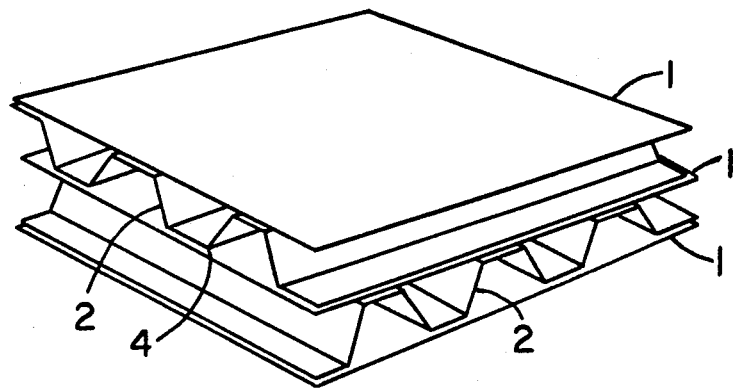
FIGS. 1a-1b schematically illustrate ceramic structural designs in accordance with the prior art.
Figure 1B:
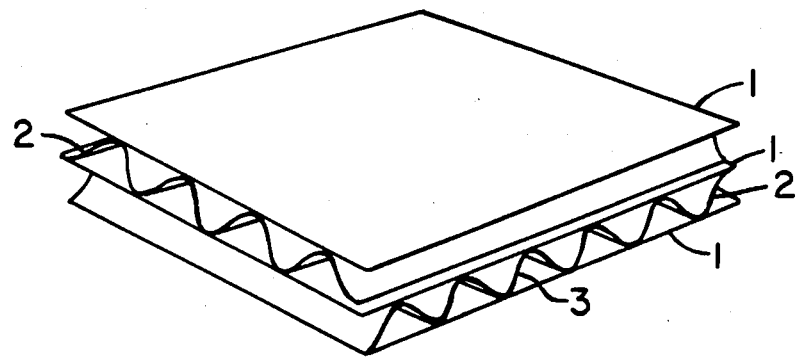

Prior art structures designed for rigidity and/or strength frequently have designs such as illustrated in FIGS. 1a and 1b of the drawing, each design comprising facing sheets 1 and corrugated or pleated stiffening or support elements 2. Rigidity in such structures depends largely on the inherent stiffness or resistance to deformation of the corrugated or pleated elements, with the bending or crushing of such structures typically resulting from the failure of the members 2 along arc portions 3 in FIG. 1b or at corner points 4 in FIG. 1a.

Figure 2:
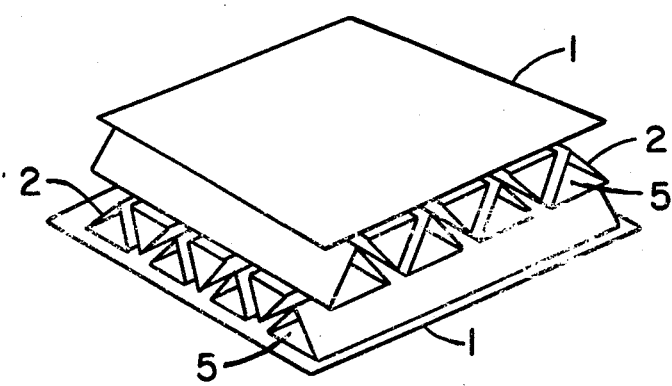
FIGS. 2 and 3 schematically illustrate designs for bonded composite ceramic structures provided in accordance with the invention.

As schematically illustrated in a preferred embodiment in FIG. 2, which is a partially exploded view of a bonded ceramic structure in accordance with the invention, the bonded structure generally comprises discrete stiffening or support elements 2. These are shown in FIG. 2 as being of triangular prism cross-section, although other polyhedral cross-sections could be used, and in the actual completed structure the support elements would be bonded to the facing sheets 1 and also preferably to each other. The triangular prism elements are formed by circumferential wall segments 5, and are made from a fiber-reinforced composite ceramic material exhibiting high stiffness so that they strongly resist deformation by corner bending or wall flexing.

Figure 3:
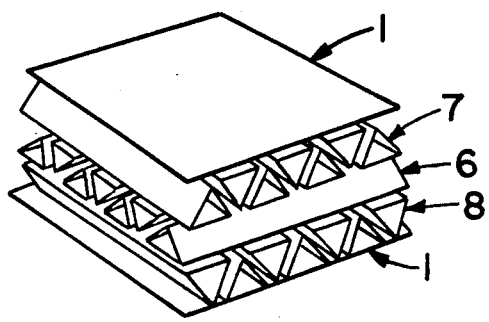

It is not essential that all of the support elements in the array of elements making up the ceramic structure be bonded to a facing sheet since, as indicated in FIG. 2, a bonded parallel array of support elements arranged in alternating upright and inverted positions itself forms planar surfaces. FIG. 3 of the drawing, which is another schematic partially exploded view, illustrates a ceramic structure according to the invention comprising a more complex sandwiched support element array. In FIG. 3, a central array or sub-array 6 of the support elements is positioned for bonding between opposing sub-arrays 7 and 8, with facing sheets 1 to be bonded only to the latter two sub-arrays.

As previously noted, the necessary strength and stiffness in the completed structure require that the fiber reinforcement within each support element include fibers or fiber groups which are multidirectionally oriented in the ceramic walls of the support so that some of the fibers traverse the corners in the walls. In this way, side or corner failure within the support cannot occur unless such fibers fail in tension. The fibers or fiber groups may comprise individual fibers, a fiber yarn, or fiber tows, or they may be provided in a fiber fabric or cloth wherein the warp or woof of the fabric defines the predominant direction of fiber travel therein.

As also previously noted, fiber multidirectionality (meaning at least two different fiber orientations) in the channel wall of the support is conveniently provided by cross-ply layering of the fibers. Desirably, each fiber layer will consist of a planar array of parallel, substantially unidirectional fibers imparting a definite prevailing fiber direction to the material. The layers can be provided, for example, by laying up parallel strands of matrix-impregnated fiber yarn.

Due to fiber multidirectionality, at least some of the fibers will be disposed so that a vector component of the fiber direction will be perpendicular to the channel axis of the support, i.e., a vector component directed circumferentially about the channel to assure fiber traverse of the corners of the channel walls. It is preferred however, that no fibers be directed purely circumferentially about the channel axis, since such an arrangement risks excessive fiber deformation and/or breakage during laydown and consolidation of the channel support preform. Most preferably, prevailing fiber directions will fall between ±60° of the direction of the channel axis of the support.

Figure 4:
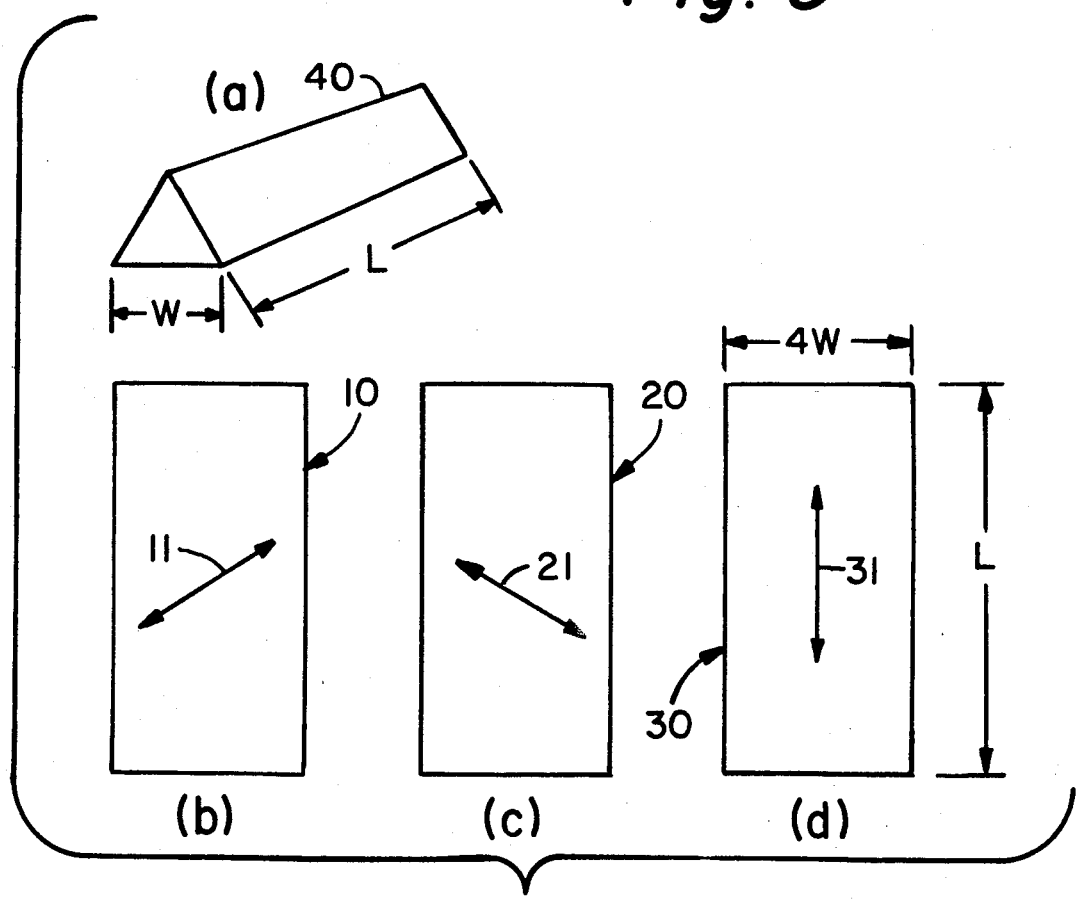
FIGS. 4(a-d) schematically illustrate impregnated fiber ply and mandrel components useful for making a ceramic support element of triangular prism cross-section in accordance with the invention.

Components for the fabrication of a composite ceramic support element are schematically illustrated in FIG. 4 of the drawing. In FIG. 4, a mandrel 40 and three inorganic fiber mats 10, 20 and 30 are shown, each mat including fiber yarn or bundles (not individually shown) comprising largely parallel spun or bundled inorganic fibers predominantly directed, respectively, in the directions 11, 21, and 31 shown. Suitable dimensions for the mats relative to triangular mandrel 40, which mandrel could be used for laying up a triangular prism support member of length l and facing width w as shown against the mandrel, are shown adjacent mat 30. The mats may, if desired, consist of prepregs, i.e., with the fibers pre-impregnated with a suspension of particulate ceramic material.

Figure 5:
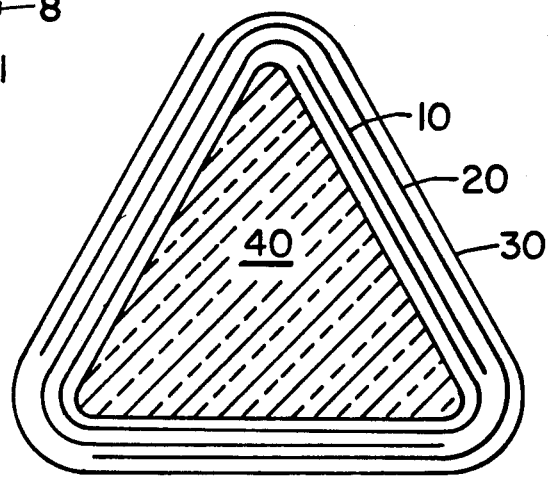
FIG. 5 is a schematic illustration in cross-section of a lay-up design for a composite ceramic support element to be incorporated into a bonded composite ceramic structure according to the invention.

FIG. 5 shows a support element preform resulting when prepreg fiber mats such as shown in FIG. 3 are sequentially applied to a mandrel. The mats 10, 20, and 30 are applied in sequence so that the overlap of each mat occurs on a different face of mandrel 40. This equalizes wall thickness about the preform while insuring that all corners of the preform comprise three fiber layers, applied in cross-ply arrangement as indicated by the fiber group direction indicated in FIG. 4. The result after consolidation is a strong, continuous polyhedral wall.

The particular ceramic material selected for use as the matrix in the composite wall of the ceramic preform and/or in the composite ceramic facing sheets is not critical, but will depend on the specific application for which the bonded composite ceramic structure is intended. For use at moderate temperatures, particulate glass may comprise the ceramic material. ("Ceramic" in the context of the present description is used in the broad sense to include glasses, glass-ceramics, and crystalline ceramics.) Examples of suitable glasses include alkaline earth aluminosilicate glasses, aluminosilicate glasses, borosilicate glasses and high silica glasses, all of which are known in the art. Particularly suitable are alkaline earth aluminosilicate glasses of $RO-B_2O_3-Al_2O_3-SiO_2$ composition wherein RO is one or more oxides selected from the group MgO, BaO and CaO, as disclosed for example in U.S. Pat. No. 4,626,515.

For use at somewhat higher temperatures, particulate thermally crystallizable glasses may be used as the ceramic material. Glasses of this type can be selected which will crystallize at the temperatures utilized to consolidate the ceramic material around the fibers. Thus a semicrystalline or fully crystallized matrix is provided which provides a composite more resistant to dimensional creep at high temperatures.

Examples of useful thermally crystallizable glasses for this application include lithium aluminosilicate, magnesium aluminosilicate, aluminosilicate, and alkaline earth aluminosilicate thermally crystallizable glasses. Particularly preferred are the alkaline earth aluminosilicate glasses and U.S. Pat. No. 4,615,987 discloses specific examples of such glasses which may be employed in the practice of the present invention.

The highest refractoriness and creep resistance in a bonded ceramic structure according to the invention is provided where the selected matrix material is composed of a conventional ceramic material such as $Al_2O_3$, $ZrO_2$, mullite, boron carbide, silicon carbide, silicon nitride or the like, which materials are generally completely free of residual glass. However, higher consolidation temperatures and pressures are generally needed to convert the particulate ceramic material to a continuous matrix, and the strengths of the composite bodies tend to be somewhat lower than in the case of composites wherein the particulate ceramic material can be sintered as a glass.

The inorganic fibers used to provide the fiber reinforcement in the support element and, optionally, the facing sheets, may be selected from among the known fibers suitable for the reinforcement of ceramic materials. Depending upon the particular matrix selected, however, the fibers will typically be selected from the group consisting of carbon, alumina, silicon carbide, silicon nitride, boron nitride, boron carbide, zirconia, zircon, mullite, or spinel fibers.

In the case of either the facing sheets or the support elements, inorganic whisker reinforcement may also be provided to enhance the strength and/or toughness of the composite ceramic material. SiC whiskers are the preferred whisker reinforcement for this purpose although other whisker reinforcement materials such as hafnium carbide, silica, alumina or graphite may alternatively be employed.

Whereas the support members must comprise at least some fiber reinforcement to provide the requisite stiffness and corner strength, the inorganic reinforcement phase disposed within the facing sheets may consist entirely of whisker reinforcement, if desired. In any case, where whiskers are to be provided in the composite ceramic material forming the facing sheets or support elements, they are most conveniently introduced into the composition as a ceramic additive, i.e., mixed with the particulate ceramic material as it is applied to the inorganic fibers or fiber groups. The whiskers are ordinarily of sufficiently fine dimensions that they can be combined with the selected ceramic material without unduly modifying the coating characteristics thereof.

Bonding of the face sheet and support elements into a bonded composite ceramic structure may be accomplished using known cementing or sealing methods. For glass composites, glass frit sealing provides a suitable cementing technique, whereas for glass-ceramic or ceramic components, sealing with devitrifiable (thermally crystallizable) cements will provide a more refractory and creep-resistant bonding method.

The invention may be further understood by reference to the following theoretical example thereof, which is intended to be illustrative, and not limiting.

EXAMPLE I

A known thermally crystallizable alkaline earth aluminosilicate glass suitable for use as a matrix material in a composite ceramic material is provided in particulate form. The glass has a composition consisting essentially, in parts by weight, of about 50.63 parts $SiO_2$, 27.66 parts $Al_2O_3$, 13.27 parts BaO, 3.44 parts MgO, and 1.0 parts $As_2O_3$, and can be thermally crystallized at temperatures of 1350° C. and above to yield one or more of barium osumilite, cordierite, mullite, and barium aluminosilicate crystal phases depending upon the precise thermal treatment employed.

The particulate glass is milled to a fine powder (average particle size of 5 microns) and is mixed with a liquid vehicle to form a flowable slurry. The liquid vehicle consists essentially, in parts by weight, of 92.5 parts $H_2O$, 7.5 parts isopropyl alcohol, and 6 parts of polyvinyl acetate as an organic binder.

To prepare a glass-impregnated fabric or cloth of reinforcing fibers, i.e., a prepreg, a silicon carbide fiber yarn (Nicalon NLM 202 yarn) is passed through a burner flame to remove organic sizing on the fibers, and is then transported through the glass slurry to impregnate the yarn with particulate glass. The impregnated yarn is then wound around a rotating drum to provide a continuous sheet or mat having a substantially unidirectional fiber orientation, and is thereupon dried at room temperature to form a green flexible prepreg. The prepreg is then cut from the drum and flattened to form a quadrangular sheet for subsequent lamination and consolidation.

A graphite mandrel of triangular prismatic cross-section is next provided, the length of the mandrel being approximately 12 inches and the cross-section being an equilateral triangle such that the faces of the mandrel are of approximately 1 inch in width, but with slightly rounded long edges.

Three rectangular prepreg mats are next cut from the prepreg sheet above described, the mats having a width corresponding to the length of the mandrel and a length approximately four times the width of the faces of the mandrel prism. The mats are cut so that the first mat has a fiber direction parallel to the mat length (0° offset), while the second and third mats are cut with the fiber direction offset +60° and −60°, respectively, from the direction of the mat length.

The prepreg mats thus provided are next wound sequentially onto the graphite mandrel to form a support member preform. The mats are applied so that, for each mat, the starting point for winding is on a different face of the mandrel prism. The result of laying up the preform in the manner described is that one fiber layer comprises fibers directed longitudinally of the mandrel fibers (parallel with the direction of the preform channel), while the remaining two layers comprise fibers forming spiral windings of +30° and −30° pitch about the mandrel axis.

Consolidation and crystallization of the preform thus provided are simultaneously carried out by encasing the preform and mandrel in a tantalum metal casing and subjecting the encased components to hot isostatic pressing at 15,000 psi at 1350° C. for one hour. Following consolidation and crystallization, the composite ceramic triangular prism support is removed from the graphite mandrel, yielding a channeled composite ceramic support member of high toughness and strength.

Cmposite ceramic facing sheets for the ceramic structural member are next provided by cutting rectangular mats from prepreg sheet produced as above described, and consolidating the mats to form the desired facing sheets by hot pressing or the like. Suitably, four 0° offset prepreg mats are stacked in cross-ply fashion, alternating the fiber direction 90° with each mat, and then the stack is hot pressed at 1450° C. and 15,000 psi for 10 minutes to provide a consolidated crystallized composite ceramic sheet comprising cross-ply SiC fiber reinforcement.

A bonded composite ceramic structure is produced from the above-described components by combining multiple triangular support elements produced as described into a channel-parallel array and then covering the array with opposing facing sheets to form a sandwich structure. A planar array consisting of 23 triangular support elements produced as above described is assembled, consisting of alternating upright and inverted parallel prisms in face-to-face contact forming a close-packed linear array of support elements as generally shown in FIG. 2 of the drawing. A novel bonding cement forming no part of the present invention, made from the flowable slurry of thermally crystallizable glass above described but additionally containing 2 parts by weight of SiC whiskers for each 8 parts by weight of powdered glass, is applied to all contacting faces of each support element prior to assembly.

To the opposing faces of the planar support element array produced as described are applied opposing fiber-reinforced composite ceramic facing sheets made by the cross-ply lamination of prepreg mats in accordance with the above description. Again, bonding cement is applied to the contacting faces of the facing sheets and exposed bases of the support elements prior to assembly.

The assembled structure thus provided is finally heat-treated at 1400° for 1½ hours to sinter and crystallize the cement and to thereby bond the component support elements and facing sheets into a unitary composite ceramic structural member. This structure would exhibit excellent strength and toughness in service at temperatures of 1200° C. or higher, due to the modular design of the fiber-reinforced support elements and the excellent creep resistance of the glass-ceramic matrix material employed.

Of course, the foregoing example is merely illustrative of the invention hereinabove described, and numerous variations and modifications of the example, including the use of alternative materials and procedures equivalent to those set forth herein, may be resorted to within the scope of the appended claims.

We claim:

1. A bonded composite ceramic structure comprising at least one ceramic facing sheet and one or more channeled ceramic support elements bonded to the facing sheet and having channel axes generally parallel thereto;
   the facing sheet consisting of a sheet of composite ceramic material comprising a ceramic, glass or glass-ceramic matrix and an inorganic reinforcement phase disposed within the matrix; and
   each support element being formed of a continuous composite ceramic polyhedral wall defining a circumferentially enclosed elongated channel, the composite ceramic wall comprising a glass, glass-ceramic, or ceramic matrix phase and a fiber reinforcement phase consisting of a multiplicity of inorganic fibers disposed within the matrix phase, the fiber reinforcement phase comprising fibers or fiber groups which are multidirectionally oriented within said walls such that at least some of the inorganic fibers traverse the corners in the polyhedral wall, and such that the prevailing directions of the fibers fall within ±60° of the direction of the channel axes of the channeled support elements.

2. A bonded composite ceramic structure comprising opposing ceramic facing sheets bonded to an array of channeled ceramic support elements positioned therebetween, the support elements having channel axes generally parallel with the facing sheets;
   each facing sheet consisting of a sheet of composite ceramic material comprising a ceramic, glass or glass-ceramic matrix and an inorganic reinforcement phase disposed within the matrix;
   each support element being formed of a continuous composite polyhedral ceramic wall defining a circumferentially enclosed elongated channel, the composite ceramic wall comprising a glass, glass-ceramic, or ceramic matrix phase and a fiber reinforcement phase consisting of a multiplicity of inorganic fibers disposed within the matrix phase, the fiber reinforcement phase comprising fibers or fiber groups which are multidirectionally oriented within said walls such that at least some of the inorganic fibers traverse the corners in the polyhedral wall, and such that the prevailing directions of the fibers fall within ±60° of the direction of the channel axes of the channeled support elements.

3. A composite ceramic structure in accordance with claim 2 wherein the array of channeled support elements includes at least one bonded plane parallel sub-array of elements in wall-to-wall contact with each other.

4. A composite ceramic structure in accordance with claim 3 wherein the channeled ceramic support elements are of generally triangular cross-section.

5. A composite ceramic structure in accordance with claim 3 which comprises multiple bonded plane parallel sub-arrays, and wherein:
   (a) the channel axes of the supports in each sub-array are parallel with at least one facing sheet;
   (b) the sub-arrays are adjoining and in bonded contact with each other; and
   (c) the direction of the channel axes in at least one sub-array is transverse to the direction of the channel axes in at least one adjoining sub-array.

6. A composite ceramic structure in accordance with claim 3 wherein the fibers in the walls of the support elements are present as multiple fiber plies.

7. A composite ceramic structure in accordance with claim 6 wherein at least one fiber ply consists of parallel strands of fiber yarn.

8. A composite ceramic structure in accordance with claim 6 wherein the fiber plies are disposed in cross-ply fashion.

9. A composite ceramic structure in accordance with claim 3 wherein the fibers in the walls of the channeled support elements are provided in the form of three or more adjoining fiber yarn plies, the plies being disposed in cross-ply fashion with each ply comprising a fiber groups with a predominant fiber direction transverse to the predominant fiber direction of at least one adjoining ply.

* * * * *